Dec. 20, 1949  G. A. LYON  2,491,503
WHEEL COVER
Filed May 12, 1945
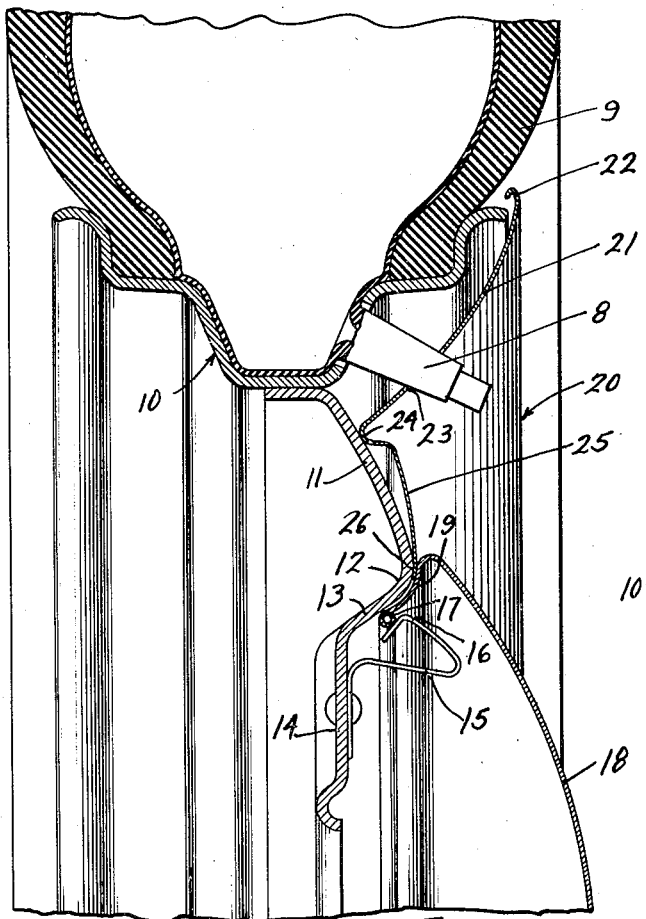
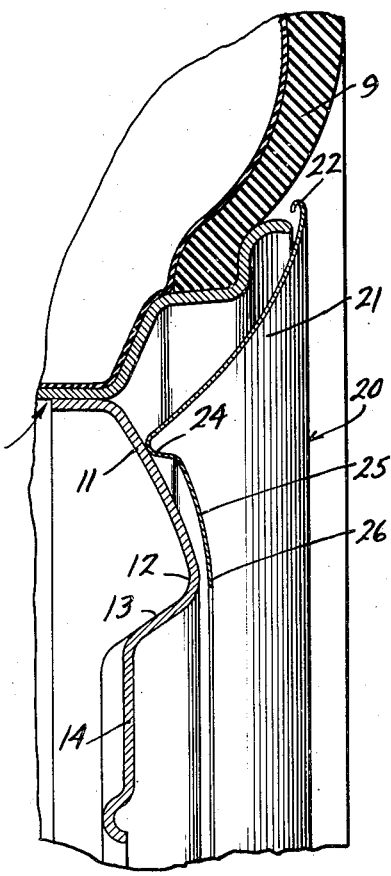
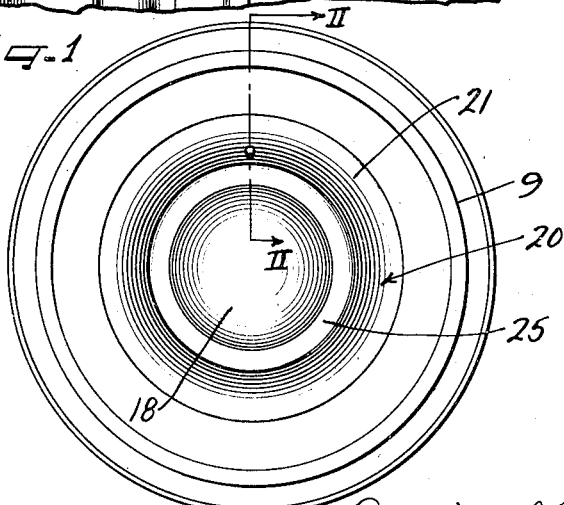
Inventor
GEORGE ALBERT LYON
by The Firm of Charles W Hill Attys.

Patented Dec. 20, 1949

2,491,503

UNITED STATES PATENT OFFICE 2,491,503

WHEEL COVER

George Albert Lyon, Allenhurst, N. J.

Application May 12, 1945, Serial No. 593,474

3 Claims. (Cl. 301—37)

This invention relates to a wheel cover and more particularly to one which will more readily adjust itself to an automobile wheel.

An object of this invention is to provide a wheel cover for the outer side of a wheel such as an automobile wheel and which may be economically manufactured on a large production basis.

Another object of this invention is to provide a self-adjusting wheel cover which will accommodate allowable manufacturing tolerances in the parts of a wheel.

Still another object of this invention is to provide a wheel cover which is inherently resilient for the purpose of adjusting itself to the outer contour of a wheel.

In accordance with the general features of this invention there is provided a wheel cover in the form of an annulus comprising divergent annular cover portions, the radially outer of which is completely out of contact with the rim part of the wheel and the radially innermost of which is adapted to be resiliently deflected toward the wheel by a retaining hub cap in such a manner that the cover can accommodate manufacturing variations in the body part of the wheel.

Still another feature of the invention relates to the provision, in the aforesaid cover, of an outer annular portion of such radial depth and angular relation to the wheel that in use it will appear to constitute a continuation of the side wall of the tire.

Other objects and features of this invention will more fully appear from the following detail description taken in connection with the accompanying drawings which illustrate a single embodiment thereof and in which Figure 1 is a side view of a wheel showing my novel cover assembly applied thereto;

Figure 2 is an enlarged fragmentary cross-sectional view taken on substantially the line II—II of Figure 1 looking in a direction indicated by the arrows; and Figure 3 is a fragmentary cross-sectional view similar to Figure 2 but taken at a plane other than through the valve stem and showing the condition of the cover prior to its being flexed into retained cooperation with the wheel by the hub cap.

As shown on the drawing:

The wheel cover of this invention is adapted to be used with a more or less conventional automobile wheel and tire. As best shown in Figure 2 the pneumatic tire and tube are designated generally by the reference character 9 and they are seated in the usual way in a multi-flange drop center type of tire rim 10 which is in turn supported upon the usual load bearing or body part 11. The body part as is customary comprises a metallic stamping and includes a bulged nose portion 12, a centrally depressed portion 13 and a generally radially extending bolt-on flange 14 adapted to be secured in the usual manner by bolts or cap screws (not shown) to a part on an axle such as a brake drum.

Mounted on the bolt-on flange in the usual way are a plurality of hub cap retaining spring clips 15 which may be of any suitable number such, for example, as three to five. Each of these clips is of a so-called inverted type and includes a turned back humped resilient extremity 16 adapted to wedgingly cooperate with the inner turned edge 17 of a hub cap 18. The hub cap likewise comprises a metallic stamping and includes an underturned skirt 19 terminating in the rolled or turned edge 17 and which skirt is shaped generally to conform with the outer configuration of the nose portion 12 of the wheel body part.

It is with a structure of this character, which is already fully disclosed in many patents previously granted to me that my novel cover designated generally by the reference character 20 is adapted to be used. The cover may be made of any suitable material such, for example, as sheet steel, stainless steel, plastic or the like. It preferably comprises a stamping in the form of an annulus.

The cover 20 includes an outer annular portion 21 which extends generally radially and axially inwardly from an outer turned edge 22 which overhangs an outer edge of the rim part 10 in close proximity to the side wall of the tire. The construction of this portion 21 together with its proximity to the tire is such as to cause this portion to appear in use to be a continuation of the side wall of the tire. This appearance can be augmented by giving the external surface of the portion 21 a white finish in which event it will appear to constitute a white side wall part of the tire.

It will also be perceived that this white side wall part 21 extends clear from the tire down to a point on the body part of the wheel where it is formed into a turned shoulder or rib 24 arranged to have bearing contact with the outer surface of the body part.

Now the portion 21 in reality constitutes one leg of a pair of divergent legs which go to make up the annular cover. That is to say the cover is of a dished configuration so that it is provided with divergent leg portions 21 and 25. The leg portion 25 comprises a resilient diaphragm or bellows since it is adapted to yield axially in the application of the cover to the wheel.

This diaphragm portion 25 terminates in an inner edge 26 so located as to engage under the outer margin of the skirt portion 19 of the hub cap for the purpose of enabling the hub cap to clamp and retain the cover on the wheel.

Attention is also directed to the fact that in the event a long valve stem 8 is used in the wheel, the cover portion 21 may be provided with an aperture 23 through which the outer extremity of the valve stem may extend so as to afford access to the valve stem without the necessity of having to remove the cover from the wheel.

In the application of the cover to the wheel, as best shown in Figure 3, the cover is first manually placed over an outer side of the wheel it being, of course, understood that the hole 23 must be aligned with the valve stem 8 so that the valve stem can extend therethrough as shown in Figure 2.

When in this position (Figure 3) the outer and inner edges 22 and 26 of the cover are out of contact with the wheel; the only portion of the cover bearing on the wheel at that time being the intermediate annular rib 24 which is at the junction of the two divergent legs 21 and 25 of the cover.

I find it particularly desirable to have the inner edge 26 away from the body part since in the manufacture of automobile wheels of the present type considerable manufacturing tolerance is permitted in the relative location of the body and rim parts of the wheel. For example, the body part 11 may be displaced as much as one-eighth of an inch in an axial direction without the wheel being particularly objectionable. That is to say the tip of the nose 12 of the body part is not necessarily located at exactly the same distance from the plane of the outer edge of the rim part in every wheel of a given size. For this reason the cover must have inherent resiliency so as to be capable of self-adjusting for these allowable manufacturing tolerances.

I provide for this by spacing the inner edge 26 from the body part and also by keeping the outer edge 22 out of contact with the outer edge of the rim of the wheel.

After the cover has been located on the wheel in the manner above described, and as best shown in Figure 3, the hub cap 18 is aligned with the center of the wheel and is then pressed axially home into retained cooperation with the spring clips 15. In the course of this action the turned edge 17 of the hub cap is cammed over the high points of the turned extremities 16 of the spring clips until it is wedged between the spring clips and the body part of the wheel. When in this position the outer margin of the hub cap is in clamping cooperation with the inner edge 26 of the cover; this edge 26 having been deflected axially from the position shown in Figure 2 into tight contact with the nose 12 of the body part.

I provide for this deflection of the inner edge 26 by the use of the diaphragm-like portion 25 which will yield axially as the edge 26 is bodily displaced toward the body part of the wheel. In other words, the yieldable character of the diaphragm 25 permits of the axial displacement of the edge 26 without any permanent deformation in the cover.

Moreover relatively slight pressure is required to displace the edge 26 and I find that by making the portion 25 substantially flat it will readily yield upon even the slightest of pressure.

It is also desirable to have the outer edge 22 of the cover out of contact with the rim part of the wheel. In fact, the cover does not bear at any point upon any of the flanges of the rim part of the wheel, thus, the rim in use may buckle or twist without bearing on the cover or without tending to force the cover off of the wheel.

It is of course known that when an automobile wheel goes around a corner there is a tendency for the rim to give way slightly and thus by keeping the cover out of contact therewith there will be less of a likelihood of any distortion of the rim forcing the cover off of the wheel.

I claim as follows:

1. In a wheel structure including a tire rim part and a body part depressed centrally and provided with hub cap retaining means, a wheel cover comprising a ring of dished cross-section including radially inner and outer divergent annular portions, the junction of said portions bearing on the body part and the peripheral margins of said annular portions being in such divergent relationship as normally to maintain the same out of contact with the wheel parts, said inner portion having a resilient diaphragm section, and a hub cap seated on said inner portion and resiliently deflecting the inner edge of said inner portion into bearing contact with the depressed center of the body part and being thus held under tension by the hub cap cooperating with said retaining means, said diaphragm portion yielding axially in the deflection of said inner margin without moving said outer edge of the cover into engagement with the wheel, said outer divergent portion extending generally radially and axially inwardly from adjacent an outer edge of the rim part and into contact, at the junction of said cover portions, with the body part.

2. In a wheel structure including a tire rim part and a body part provided with hub cap retaining means, a wheel cover comprising an annulus having a dished configuration so as to provide radially outer and inner divergent leg portions terminating in a junction rib extending axially inwardly and bearing on the body part of the wheel, the edge of said outer portion being at all times spaced from the wheel and out of contact therewith and the inner edge of the annulus being deflectable axially toward and into contact with the body part, and a hub cap cooperating with the retaining means on the body part and deflecting said inner edge axially into bearing contact with the body part, said inner leg portion also including a resilient diaphragm-like section readily yieldable axially to permit of the deflection of the inner edge of the inner leg portion into bearing contact with the body part, said outer leg portion extending generally radially and axially inwardly from an outer edge of the rim part to the body part adjacent to the medial plane of the tire, whereby said outer leg in use will appear to constitute a continuation of a side wall of the tire.

3. In a wheel structure including a tire rim and a body part with hub cap retaining means on the body part, a cover annulus having an axially inwardly extending annular rib dividing the same into inner and outer divergent leg sections, said rib engaging the body part and said legs diverging at such angles from said rib as normally to remain out of contact with the adjacent wheel parts, said inner leg comprising throughout the major extent of its width a resilient diaphragm portion, and a hub cap secured in place on said body part by said retaining means and engaging the inner edge of said inner leg and deflecting the same into secured engagement with the body part, said rib being of such construction as to prevent distortion of said outer leg upon deflection of said diaphragm portion, whereby said outer leg remains out of contact with the wheel in the fully assembled relationship of the cover with the wheel.

GEORGE ALBERT LYON.

REFERENCES CITED

The following references are of record in the file of this patent:

UNITED STATES PATENTS

| Number | Name | Date |
|---|---|---|
| 2,016,251 | Lyon | Oct. 1, 1935 |
| 2,124,789 | Lyon | July 26, 1938 |
| 2,333,626 | Aske | Nov. 9, 1943 |
| 2,368,232 | Aske | Jan. 30, 1945 |
| 2,368,254 | Lyon | Jan. 30, 1945 |